(12) United States Patent
Bala et al.

(10) Patent No.: US 8,009,329 B2
(45) Date of Patent: Aug. 30, 2011

(54) FLUORESCENCE-BASED CORRELATION MARK FOR ENHANCED SECURITY IN PRINTED DOCUMENTS

(75) Inventors: Raja Bala, Webster, NY (US); Shen-Ge Wang, Fairport, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 827 days.

(21) Appl. No.: 11/937,673

(22) Filed: Nov. 9, 2007

(65) Prior Publication Data
US 2009/0122349 A1   May 14, 2009

(51) Int. Cl.
  *H04N 1/405* (2006.01)
(52) U.S. Cl. ........................ 358/3.28; 358/2.1
(58) Field of Classification Search ............... 358/3.28, 358/1.9, 2.1, 1.12, 1.18, 510, 512
See application file for complete search history.

(56) References Cited

U.S. PATENT DOCUMENTS

| | | | |
|---|---|---|---|
| 3,611,430 A * | 10/1971 | Watchorn et al. | 346/140.1 |
| 3,614,430 A | 10/1971 | Berler | |
| 3,870,528 A | 3/1975 | Edds et al. | |
| 3,900,608 A | 8/1975 | Dierkes et al. | |
| 4,186,020 A | 1/1980 | Wachtel | |
| 4,374,643 A | 2/1983 | Suzuki et al. | |
| 4,384,069 A | 5/1983 | Wendel et al. | |
| 4,440,846 A * | 4/1984 | Sanders et al. | 430/138 |
| 4,603,970 A | 8/1986 | Aota et al. | |
| 4,604,065 A | 8/1986 | Frazer et al. | |
| 5,042,075 A | 8/1991 | Sato | |
| 5,256,192 A | 10/1993 | Liu et al. | |
| 5,286,286 A | 2/1994 | Winnik et al. | |
| 5,371,126 A | 12/1994 | Strickler | |
| 5,484,292 A | 1/1996 | McTaggart | |
| 5,514,860 A | 5/1996 | Berson | |
| 5,734,752 A | 3/1998 | Knox | |
| 5,790,703 A * | 8/1998 | Wang | 358/3.28 |
| 5,847,713 A | 12/1998 | Ueda | |
| 6,013,307 A | 1/2000 | Hauser et al. | |
| 6,057,858 A | 5/2000 | Desrosiers | |
| 6,106,021 A | 8/2000 | Phillips | |
| 6,138,913 A | 10/2000 | Cyr et al. | |
| 6,252,971 B1 | 6/2001 | Wang | |
| 6,526,155 B1 | 2/2003 | Wang et al. | |
| 6,731,409 B2 | 5/2004 | Wang et al. | |
| 6,731,785 B1 | 5/2004 | Mennie et al. | |

(Continued)

FOREIGN PATENT DOCUMENTS

EP    0847016 A2    6/1998

*Primary Examiner* — Thomas D Lee
*Assistant Examiner* — Stephen M Brinich
(74) *Attorney, Agent, or Firm* — Fay Sharpe LLP

(57) ABSTRACT

A fluorescence-based correlation mark is included in a printed document by encoding the correlation mark as phase shifts in the yellow halftone image only of a printed color document. The correlation mark transparency key is likewise printed using only yellow colorant or can be printed in black or with another colorant or mixture of colorants that will appear dark or black when subjected to UV illumination. UV illumination of the document without use of the transparency key, and use of the transparency key without UV illumination of the document are insufficient to reveal the fluorescence-based correlation mark. UV illumination of the document while the transparency key is overlaid with the document will allow the correlation mark to be perceived.

12 Claims, 5 Drawing Sheets

U.S. PATENT DOCUMENTS

| | | | |
|---|---|---|---|
| 6,773,549 B1 | 8/2004 | Burkhardt | |
| 6,865,001 B2 | 3/2005 | Long et al. | |
| 7,070,252 B2 | 7/2006 | de Queiroz et al. | |
| 7,092,128 B2 | 8/2006 | Wang et al. | |
| 7,099,019 B2 | 8/2006 | Silverbrook et al. | |
| 7,126,721 B2 | 10/2006 | Wang et al. | |
| 7,127,112 B2 | 10/2006 | Sharma et al. | |
| 7,148,999 B2 | 12/2006 | Xu et al. | |
| 7,180,635 B2 | 2/2007 | Wang et al. | |
| 7,198,382 B2 | 4/2007 | Donovan | |
| 7,213,757 B2 | 5/2007 | Jones et al. | |
| 7,215,817 B2 | 5/2007 | de Queiroz et al. | |
| 7,218,785 B2 | 5/2007 | Sharma et al. | |
| 7,224,489 B2 | 5/2007 | Loce et al. | |
| 7,286,682 B1 | 10/2007 | Sharma et al. | |
| 7,324,241 B2 | 1/2008 | Eschbach et al. | |
| 7,589,865 B2 | 9/2009 | Eschbach et al. | |
| 7,614,558 B2 | 11/2009 | Katsurabyashi | |
| 7,706,565 B2 * | 4/2010 | Levy et al. | 382/100 |
| 7,800,785 B2 | 9/2010 | Bala et al. | |
| 2003/0193184 A1 | 10/2003 | Taylor et al. | |
| 2005/0152040 A1 | 7/2005 | Goggins | |
| 2007/0139681 A1 | 6/2007 | Eschbach et al. | |
| 2007/0262579 A1 | 11/2007 | Bala et al. | |
| 2007/0264476 A1 | 11/2007 | Bala et al. | |
| 2008/0299333 A1 | 12/2008 | Bala et al. | |
| 2008/0302263 A1 | 12/2008 | Eschbach et al. | |
| 2008/0304696 A1 | 12/2008 | Eschbach et al. | |
| 2008/0305444 A1 | 12/2008 | Eschbach et al. | |

* cited by examiner

FLUORESCENCE-BASED CORRELATION MARK FOR ENHANCED SECURITY IN PRINTED DOCUMENTS

CROSS-REFERENCE TO RELATED APPLICATIONS

Cross reference is made to the following co-pending applications: Ser. No. 11/314,509 filed Dec. 21, 2005 entitled "Printed Visible Fonts with Attendant Background" in the name of co-inventors Reiner Eschbach, James R. Low, William Fuss, and Shen-ge Wang; Ser. No. 11/382,897 filed May 11, 2006 entitled "Substrate Fluorescence Mask for Embedding Information in Printed Documents" in the name of Raja Bala and Reiner Eschbach; and, U.S. patent application Ser. No. 11/382,869 filed May 11, 2006 entitled "Substrate Fluorescence Pattern Mask for Embedding Information in Printed Documents" in the name of Raja Bala and Reiner Eschbach.

BACKGROUND

Security is an important concern in the realm of documents and digital production and/or reproduction of same. Known digital image printing/copying systems produce documents of such high quality that a need has been identified to prevent effective printing/copying of certain documents such as high-value printed items including tickets, financial instruments, security passes, and the like. Known techniques include printing the original document in a manner such that it includes a "watermark," using only conventional paper and toner or ink. Two such watermarking techniques have been developed and are known to increase document security, i.e., to limit counterfeit printing and copying: (i) fluorescence marks; and (ii) correlation marks.

Methods and systems are known for including fluorescence marks in printed documents using conventional papers (e.g., ordinary "copy paper") and ordinary inks/toners (e.g., CMYK ink/toner), specifically by using metameric colorant mixtures. Under ambient (non-ultraviolet) or visible lighting conditions (e.g., wavelengths of about 400-700 nanometers (nm)), two different colorant mixtures that are printed on respective regions of the paper provide a printed document region that appears substantially uniform in color. Under ultraviolet (UV) lighting or radiation (e.g., wavelengths shorter than about 400 nm), these colorant mixtures exhibit different UV absorption and, thus, suppression of fluorescence of the optical brightening agents used in printing/copying papers such that regions printed with the colorant mixture that suppresses less of the substrate fluorescence appear as a lighter regions while the surrounding areas printed with the colorant mixture that strongly suppresses substrate fluorescence appear as a darker regions. These contrast variations under UV lighting are used to create watermark patterns, e.g., numbers, letters, symbols, shapes.

An example of this is shown in FIG. 1, wherein a colorant mixture "B" is selected and applied to patch area BP, which here is arranged in this example as the alphanumeric symbol "0". Further, a colorant mixture "A" is selected and applied to patch area AP arranged here in substantially close spatial proximity to patch area BP, and thereby providing a background around patch area BP. Both colorant mixture A and colorant mixture B are comprised of a suitably selected colorant or colorant mixtures, but colorant mixtures A and B are different mixtures. Each colorant mixture A or B may be, for example, either a single CMYK colorant or any mixture of CMYK colorants. In the illustrated example, colorant mixture A will be selected so as to provide higher UV absorption (greater substrate fluorescence suppression) than that selected for colorant mixture B. The colorant mixtures A and B will also be selected to match each other closely in their average color and luminance under ambient light. As shown at UVL in FIG. 1, under UV lighting conditions, patch BP will appear brighter as compared to patch AP, due to the relatively limited suppression of the fluorescence of the optical brightening agents in the paper substrate as compared to the patch AP, thus forming a watermark W. In contrast, under ambient light conditions as shown at AML, patches AP,BP are at least substantially indistinguishable. By way of example an approximate 50% grayscale gray colorant mixture may be realized with a halftone of black (K) colorant only and used for colorant mixture B to print patch BP. This may then be color-matched against a colorant mixture A comprising a high amount of yellow (Y) mixed with enough cyan (C) and magenta (M) to yield a similar approximate 50% grayscale gray colorant mixture A which is used to print the patch AP. With the given high content of yellow colorant in colorant mixture A, this colorant mixture will provide much higher absorption of UV or suppression of native substrate fluorescence as compared to the patch BP, so that under UV lighting conditions, the patch BP will be readily apparent as a watermark W1. The two colorant mixtures will appear quite nearly identical "gray" under normal viewing or "ambient' illumination as shown at AML in FIG. 1. Thus, when a document including such a fluorescence mark is subjected to UV illumination, the watermark W1 is revealed. A printed "look-alike" document or mere photocopy will not include the watermark. Those of ordinary skill in the art will recognize that the difference in substrate fluorescence suppression as between colorant mixtures A and B results primarily from the fact that the colorant mixture B (single black colorant in the current example) requires less substrate coverage for a desired gray level printed region as compared to colorant mixture A (a combination of cyan, magenta, yellow colorants in the current example) that requires more ink/toner coverage of the substrate to achieve a corresponding matching gray level. Thus, a high level of yellow colorant in mixture A leads to more overall substrate coverage (greater UV fluorescence suppression) because higher amounts of cyan and magenta are required in colorant in mixture A to match the printed gray level of the colorant mixture B. Additional details and variations relating to fluorescence marks are disclosed in U.S. patent application Ser. No. 11/382,897 filed May 11, 2006 in the name of Raja Bala and Reiner Eschbach and entitled "Substrate Fluorescence Mask for Embedding Information in Printed Documents" and U.S. patent application Ser. No. 11/382,869 filed May 11, 2006 in the name of Raja Bala and Reiner Eschbach and entitled "Substrate Fluorescence Pattern Mask for Embedding Information in Printed Documents" and the disclosures of both these applications are hereby expressly incorporated by reference into the present specification.

As noted, a correlation mark is another known watermarking technique. By way of example, as shown in FIG. 2, a checkerboard halftone pattern HP is printed on paper by a regular 45-degree cluster halftone screen and has 13 columns of halftone cells. Another checkerboard halftone pattern HP' covering an equal spatial area overall is printed on paper by a halftone screen having four slightly stretched columns C5-C8 in the middle section, such that the halftone pattern HP' has only 12 columns over the same spatial width as the pattern HP. The patterns HP and HP' are perceived as the same gray level to a human observer and the phase shift is substantially hidden under normal image viewing conditions. In the pattern HP', due to the pitch difference between the regular columns C1-C4,C9-C12 and the slightly stretched columns C5-C8, the phase, which represents the transition between white and black, has changed from "in phase" with the pattern HP, (0 radian phase shift), for columns C1-C4, to "opposite phase" ($\pi$ radian phase shift) for columns C9-C12, with varying, increasing phase shift for the stretched columns C5-C8. If a transparency key K is printed with the halftone pattern HP and overlaid with the paper-printed halftone pattern HP as shown at K+HP, the result is unchanged relative to the original printed pattern HP because the key K and printed pattern can be registered, solid-on-solid, blank-on-blank. In contrast, when the key K is overlaid with the phase-shifted pattern HP' as shown at K+HP', the original printed checkerboard pattern HP' gradually disappears in proportion to the phase difference between the pattern HP' and the key K moving from left to right in the image, until the checkerboard pattern HP' is completely black (or other solid color) where the pattern HP' and key K are opposite phase. The average reflectance is higher in the registered regions C1-C4 and lower in the partially phase shifted regions C5-C8 and still lower in the opposite phase regions C9-C12. Therefore, if a portion of an image is encoded with $\pi$ radian phase-shifted halftone cells and immediately surrounding these $\pi$ radian phase-shifted halftone cells are halftone cells that are 0 radian phase-shifted, by overlapping a checkerboard pattern transparency key of the same spatial frequency, a high contrast watermark W2 can be defined by the low reflectance areas where the key and halftone pattern are out of phase. Accordingly, a document can be printed in this manner to include a watermark that is completely or at least substantially undetectable until a corresponding transparency key is overlaid to reveal the phase-shifted halftone regions. Correlation marks are disclosed, e.g., in U.S. Pat. No. 6,252,971 to Wang entitled "Digital Watermarking Using Phase-Shifted Stoclustic Screens" which is also hereby expressly incorporated by reference into the present disclosure.

While both fluorescence marks and correlation marks are highly effective, a need has been identified for a watermark that is less apparent under ambient lighting conditions and more apparent during a security check of the document. Accordingly, the present development combines the principles of fluorescence marks and correlation marks to achieve this goal.

SUMMARY

In accordance with one aspect of the present development, a method for authenticating a printed color document includes illuminating the printed color document with a UV light source to emphasize a portion of the image printed using yellow colorant while the printed color document is overlaid with a transparency key so that both the transparency key and the printed color document are simultaneously illuminated by the UV light source. The transparency key includes a transparency key halftone pattern printed thereon. Any correlation marks embedded the portion of the image printed using yellow colorant are observed through the transparency key while the transparency key and printed color document are simultaneously illuminated by the UV light source.

In accordance with another aspect of the present development, a device for authenticating a printed color document includes a frame, a transparency overlay key supported in an opening of the frame, and a UV light source connected to the frame and arranged to direct UV radiation onto and through said transparency overlay key. The frame is adapted to receive and position beneath said transparency overlay key a printed document to be authenticated. The transparency overlay key and the printed document located beneath same are subjected to UV radiation from the UV light source.

In accordance with another aspect of the present development, a method of enhanced document security includes using a substrate that will fluoresce when subjected to UV radiation. The method further includes receiving digital image data defining a document to be printed in terms of at least cyan, magenta, yellow and black image separations, and receiving another input defining a watermark to be printed as a security part of the document. Cyan, magenta, black, and yellow halftone patterns are derived from the cyan, magenta, black, and yellow image separations, respectively. The yellow halftone pattern is modified using phase shifts to provide a phase-shifted yellow halftone pattern that encodes the defined correlation mark. The document is printed on the substrate according to the cyan, magenta, black, and phase-shifted yellow halftone patterns. The printed document is adapted to be authenticated by overlaying a transparency key on the printed document and simultaneously subjecting the transparency key and the printed document to UV illumination to reveal the watermark.

In accordance with another aspect of the present development, a printed document includes a fluorescence-based correlation mark, wherein the correlation mark is printed in the printed document using only a yellow colorant and is visible to authenticate said printed document only when the printed document is subjected to UV illumination while said printed document is overlaid with a transparency key on which a correlation mark decoding pattern is printed.

DETAILED DESCRIPTION

Figure 3:
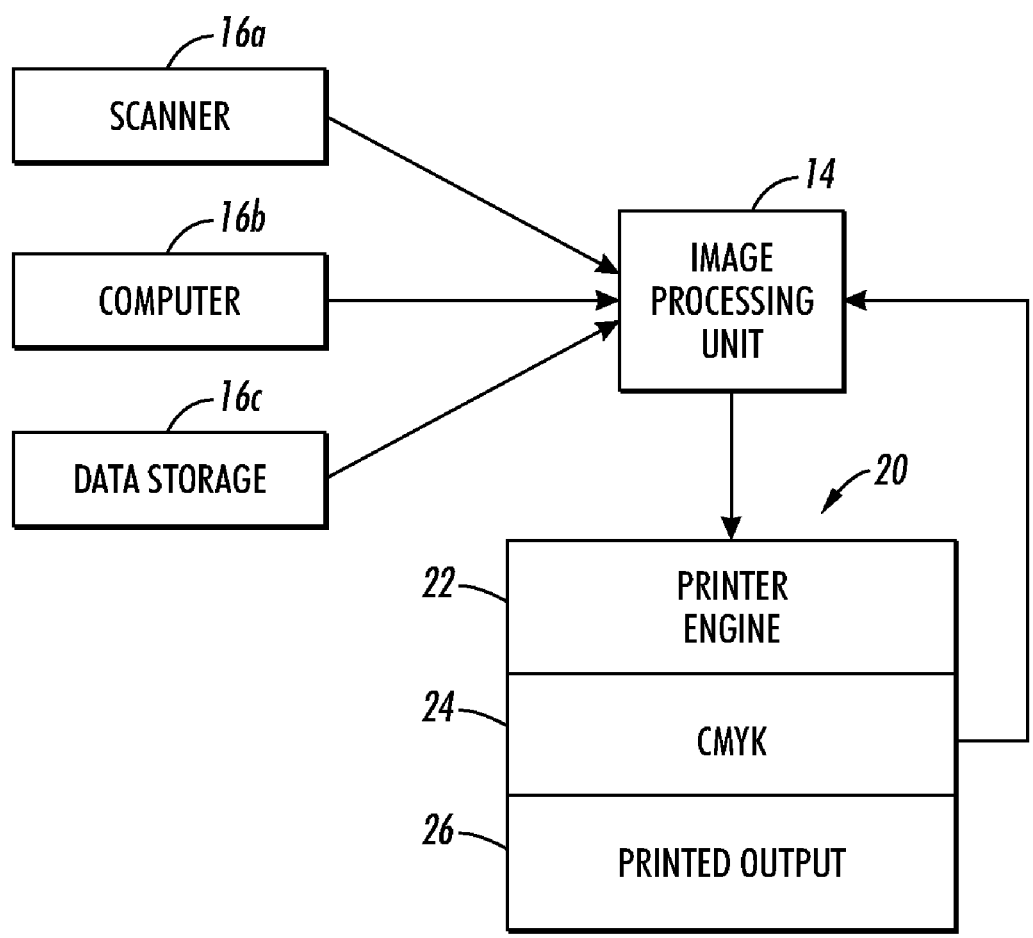
FIG. 3 discloses a system for implementing a method in accordance with the present development.

The system and/or method in accordance with the present development is/are preferably implemented in a printing system such as any commercially available multi-colorant ("color") printer, which can be provided as part of a printing and/or reproduction apparatus. Typically, the printer implements a CMYK color space and includes a xerographic printer engine although the present development is applicable to other printing methods such as ink-jet. FIG. 3 illustrates one example of an apparatus for implementing a method in accordance with the present development. The apparatus 10 comprises an image processing unit (IPU) 14 for carrying out the digital image processing operations disclosed herein. The IPU 14 is defined by electronic circuitry and/or software that is dedicated to digital image processing and/or can comprise a general purpose computer programmed to implement the image processing operations disclosed herein. The IPU 14 is adapted to receive image data from a source such as a scanner 16a, computer 16b (e.g., a digital front-end (DFE)), and/or data storage 16c or another source that is part of the apparatus 10 and/or that is operably connected to the IPU 14 through a network or other means. The apparatus 10 comprises an image output or printing unit 20 including a xerographic or other print engine 22 for printing the image data on paper, a transparency, or another recording medium using toner and/or ink as is known in the art, according to the CMYK or other multi-colorant color space 24. The printer unit 20 further comprises a printed output station 26 for physical output of the final printed product such as printed paper, transparencies or other recording media sheets. Examples of suitable commercially available systems 10 include, but are not limited to, the Phaser™, WorkCentre™, DocuColor™, and iGen3™ printing/copying/digital press systems available from Xerox Corporation.

Figure 1:
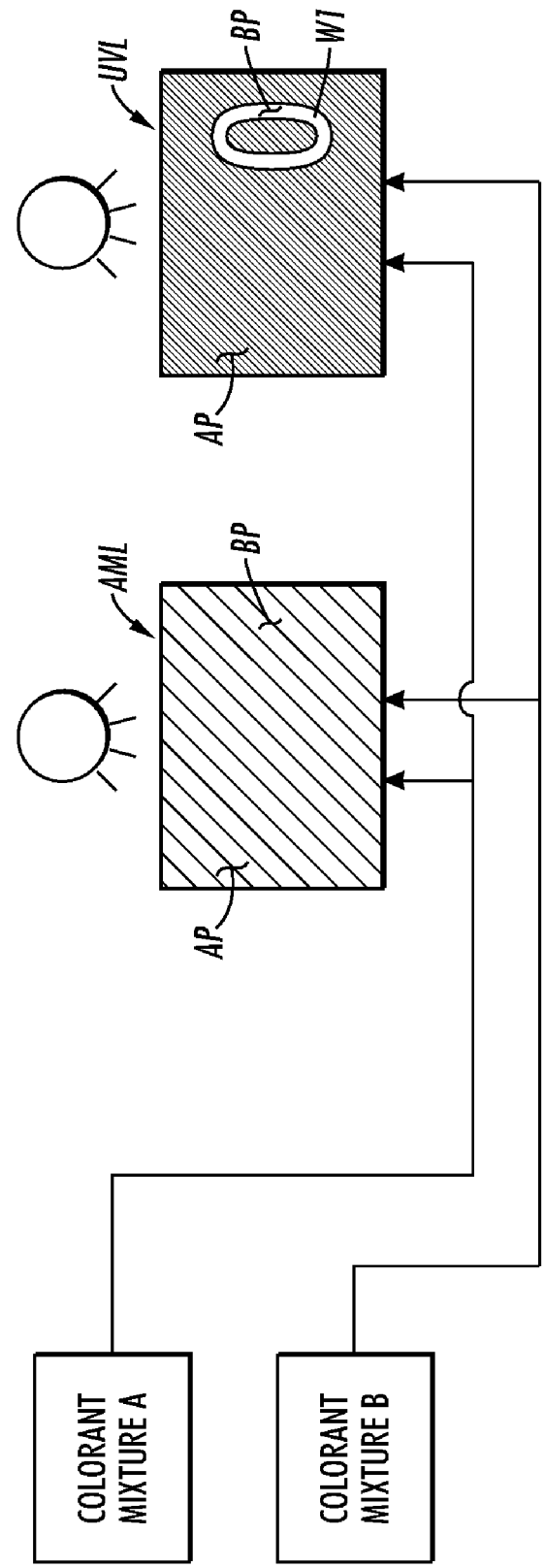
FIG. 1 (prior art) diagrammatically discloses the inclusion of a fluorescence mark in a printed document.
Figure 2:
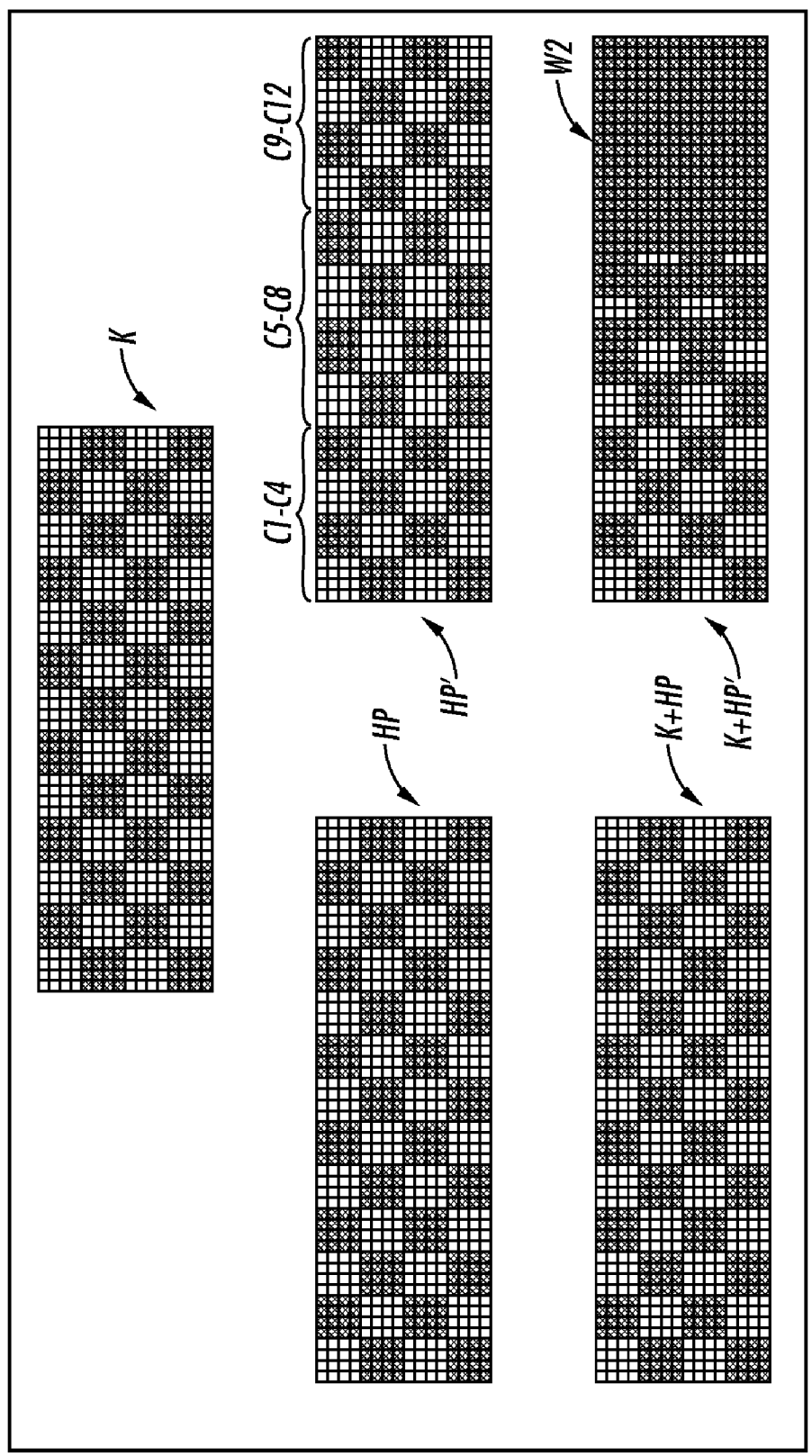
FIG. 2 (prior art) diagrammatically discloses the inclusion of a correlation mark in a printed document.
Figure 4:
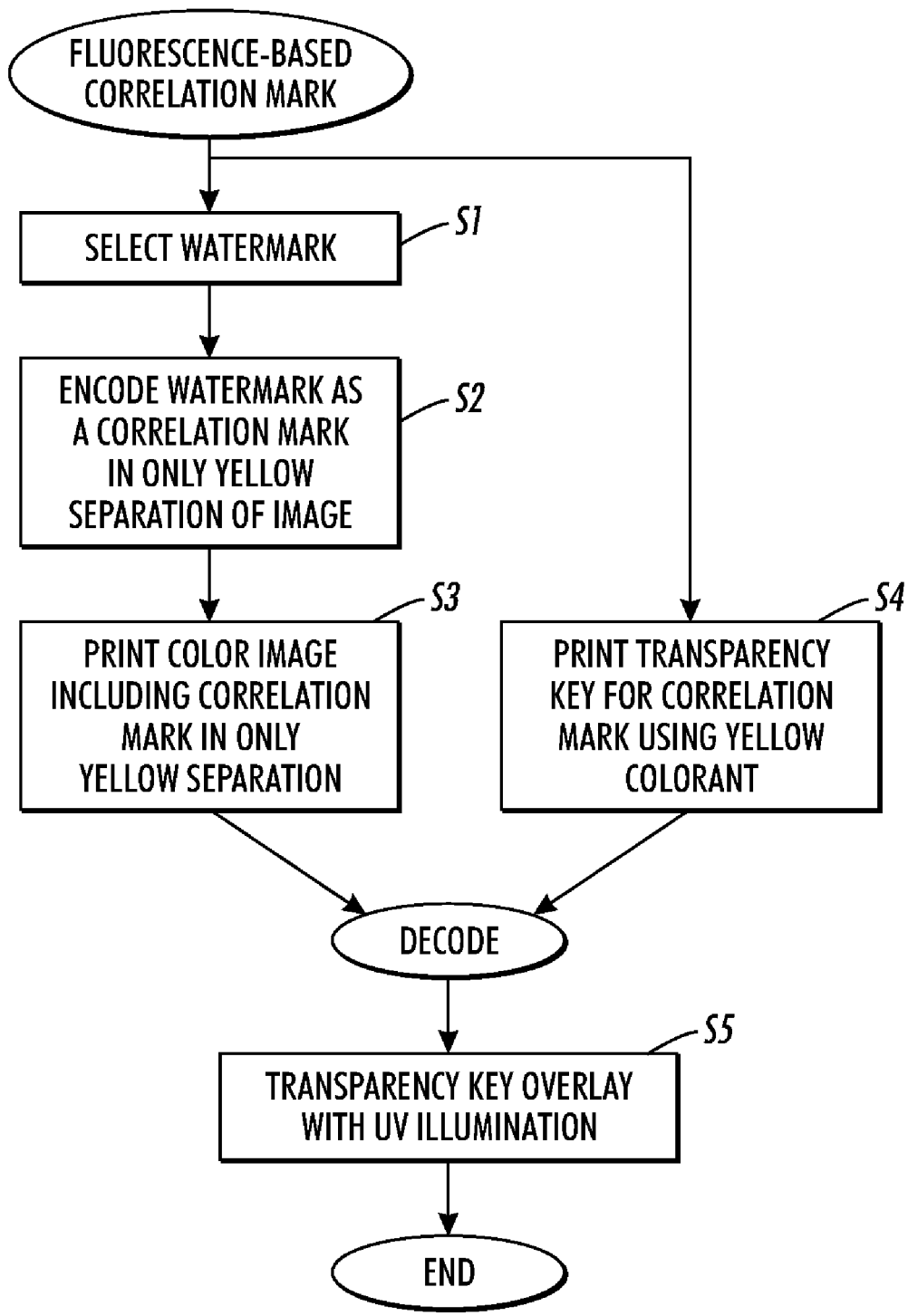
FIG. 4 is a flow chart disclosing a fluorescence-based correlation mark method in accordance with the present development.

Referring particularly to FIG. 4, a fluorescence-based correlation mark method in accordance with the present development is disclosed. In a step S1, a watermark is selected, e.g., a pattern or symbol, or an alphanumeric character or string, using the computer 16b or other input to the IPU 14. In a step S2, the IPU 14 is used to encode the selected watermark as a correlation mark in a color image, e.g., as halftone phase shifts as disclosed above in connection with FIG. 2, but only in the yellow separation for a CMYK digital image, without altering the other (CMK) separations of the color image. In a step S3, the image is then printed in a conventional manner using the printing unit 20, i.e., using the data from all CMYK color separations and corresponding inks/toners on conventional printing/copying paper or another substrate that includes optical brightening agents that fluoresce under UV illumination, where the yellow (Y) separation only includes the encoded correlation mark and is printed with the required halftone phase shifts. In a previous or subsequent separate step S4, a transparency key overlay halftone pattern is printed, also using yellow ink/toner typically at a 50% gray level, and corresponds in all ways including frequency, structure, dot shape, screen angle, etc., to the halftone method used to print the yellow separation of the printed document, except that $\pi$ radian phase shifts are used to embed the correlation mark data in the yellow separation of the printed document. In the step S4, the transparency key overlay halftone pattern can alternatively be printed in black or another color or mixture of colors that will appear dark or black under both ambient (non-UV) and UV illumination. The use of only yellow ink/toner in step S4 is often preferred, however, to limit the usability and visibility of the transparency overlay in the absence of a UV light source, as the pattern imprinted in yellow on the transparency key will be difficult to perceive and will not decode an embedded watermark in the yellow separation for a human observer unless subjected to UV illumination. In a common example, the transparency key overlay halftone pattern is a checkerboard halftone pattern that corresponds to a 50% digital input level. Because yellow ink/toner on paper exhibits low contrast under ambient (non-UV) lighting conditions and is difficult for humans to perceive as compared to the cyan, magenta, and black ink/toner of the printed CMYK color image, the correlation mark embedded in only the yellow separation is undetectable in the printed image under normal lighting conditions. Furthermore, even under UV illumination of the printed CMYK image including the correlation mark embedded in the yellow separation, the correlation mark is not visible to the naked eye as a fluorescence mark because it is encoded as phase sifts in the halftone pattern of the yellow separation. Similarly, the transparency key is also printed in yellow and the corresponding halftone pattern thereon is largely undetectable under ambient lighting conditions. If the yellow transparency key is overlaid on the printed CMYK image including the correlation mark embedded in the yellow separation under ambient lighting conditions, the low contrast and visibility of the yellow separation in the image and key prevent human perception of reduced average reflectance in the phase-shifted areas of the yellow separation halftone pattern.

In a decoding operation, a step S5 is performed to overlay the transparency key printed in step S4 with the image printed in step S3, while simultaneously subjecting the combined image and overlaid transparency key to UV illumination. The result is that the yellow printed areas of transparency key halftone pattern become visible as black or dark areas, while the yellow ink/toner in the yellow separation of the printed CMYK image also become visible as black or dark areas in high contrast against the other areas of the fluorescing areas of the paper substrate so as to allow the phase shifted halftone regions of the yellow separation to be perceived where the transparency key overlay and yellow separation image are sufficiently out of phase, e.g., $\pi$ radians out of phase or some part thereof. As such, the correlation mark encoded in the yellow separation becomes visible under UV illumination using the yellow-printed transparency key.

Figure 5:
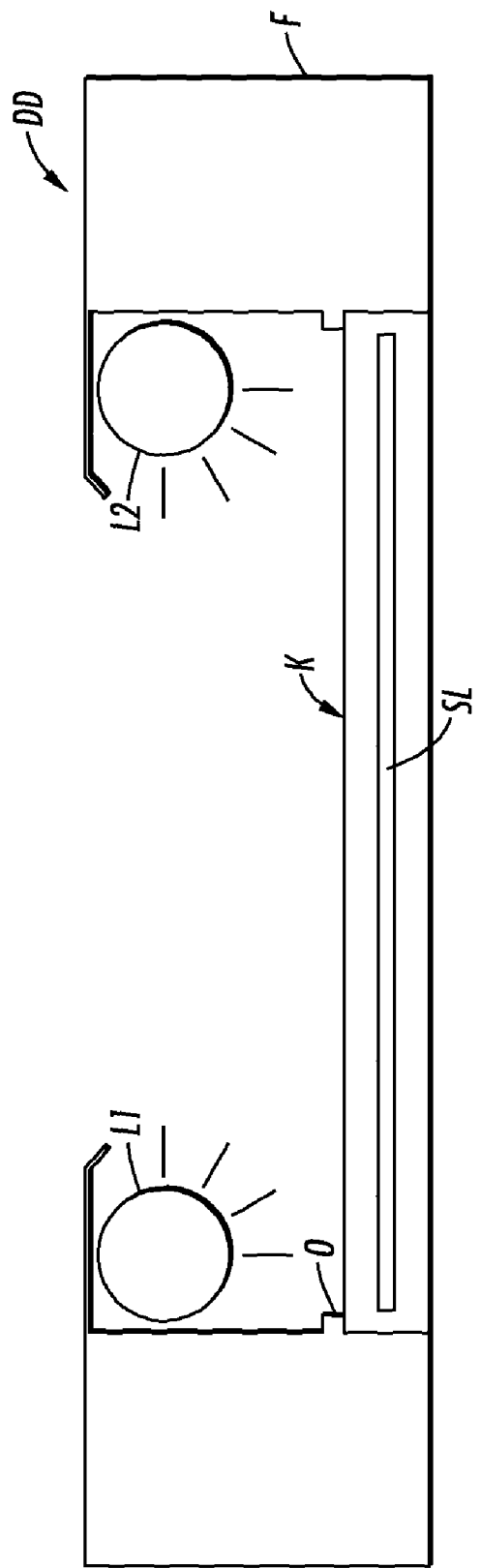
FIG. 5 diagrammatically illustrates one suitable fluorescence-based correlation mark decoding device in accordance with the present development.

FIG. 5 diagrammatically illustrates one suitable fluorescence-based correlation mark decoding device DD in accordance with the present development. The device includes a frame made from molded plastic or the like and supports, in an opening O, a transparency halftone pattern key K for correlation mark decoding as described above. The frame further supports one or more UV light sources L1,L2, preferably in a location elevated above and oriented toward the key so that the UV sources L1,L2 direct UV light onto and through the transparency key K. The UV sources L1,L2 are powered by one or more batteries carried by the frame or the device DD can include a power cord to supply AC power to the sources L1.L2. The frame F defines a slot or other opening SL that allows a printed document to be inserted therein so as to be positioned immediately under and adjacent the transparency key K when the UV sources L1,L2 are active, to allow for detection of any fluorescence-based correlation marks in the printed document. When a printed document is inserted into the slot SL, the relative movement between the document and key facilitates detection of any fluorescence-based correlation marks present in the document.

A main advantage of the present development is that the watermark does not affect image quality in the ambient lighting environment. This can be understood by noting that any additional information stored inside an image will influence the image structure and thus introduce noise. The watermark strength is directly tied to the noise amplitude and vice versa. Using a fluorescence-based correlation mark as just described makes use of the fact that the UV illumination will increase watermark amplitude by roughly an order of magnitude, whereas the watermark-induced noise in the ambient lighting environment is not perceptible due to the inclusion of the watermark in the yellow image separation only. As such, the present development provides a gain of approximately 10× for the watermark/noise trade-off. Also, use of only yellow colorant to print the transparency key renders the key useless for correlation mark detection except when exposed to UV illumination.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for authenticating a printed color document, said method comprising:

illuminating the printed color document with a UV light source to emphasize a portion of the image printed using yellow colorant while the printed color document is overlaid with a transparency key so that both said transparency key and said printed color document are simultaneously illuminated by said UV light source, said transparency key including a transparency key halftone pattern printed thereon; and, observing through said transparency key any correlation marks embedded said portion of said image printed using yellow colorant while said transparency key and printed color document are simultaneously illuminated by said UV light source.

2. The method for authenticating a printed color document as set forth in claim 1, wherein said transparency key halftone pattern is printed using a single colorant that appears darker under UV illumination as compared to ambient illumination.

3. The method for authenticating a printed color document as set forth in claim 2, wherein said single colorant in which said halftone pattern is printed is yellow.

4. The method for authenticating a printed color document as set forth in claim 3, wherein said portion of the image printed using yellow colorant is printed with an image halftone pattern, and wherein said transparency key halftone pattern and said image halftone pattern comprise a common spatial frequency.

5. The method for authenticating a printed color document as set forth in claim 4, wherein said transparency key halftone pattern is derived from an approximately 50% gray input level.

6. The method for authenticating a printed color document as set forth in claim 5, wherein said transparency key halftone pattern comprises a checkerboard pattern.

7. A device for authenticating a printed color document, said device comprising:

a frame;

a transparency overlay key supported by said frame, said transparency overlay key comprising a transparency on which a halftone pattern is printed using yellow colorant;

a UV light source connected to said frame and arranged to direct UV radiation onto and through said transparency overlay key;

wherein said frame defines a slot adapted for selective insertion of a printed document to be authenticated so that said printed document is positioned beneath and adjacent said transparency overlay key for subjecting said transparency overlay key and said printed document to UV radiation from said UV light source.

8. A method of enhanced document security, said method comprising:

providing a substrate that will fluoresce when subjected to UV radiation;

receiving digital image data defining a document to be printed in terms of at least cyan, magenta, yellow and black image separations;

receiving input defining a watermark to be printed as part of the document;

deriving cyan, magenta, black, and yellow halftone patterns from the cyan, magenta, black, and yellow image separations, respectively;

modifying the yellow halftone pattern using phase shifts to define a phase-shifted yellow halftone pattern that encodes the watermark as a correlation mark;

printing the document on the substrate according to the cyan, magenta, black, and phase-shifted yellow halftone patterns, wherein the printed document is adapted to be authenticated by overlaying a transparency key on the printed document and simultaneously subjecting the transparency key and the printed document to UV illumination to reveal the correlation mark.

9. The method of enhanced document security as set forth in claim 8, wherein the transparency key comprises a correlation mark decoding halftone pattern printed thereon with a spatial frequency that corresponds to a spatial frequency of the phase-shifted yellow halftone pattern.

10. The method of enhanced document security as set forth in claim 9, further comprising providing said halftone transparency key, wherein said halftone pattern of said transparency key is printed in yellow color.

11. The method of enhanced document security as set forth in claim 10, wherein said halftone pattern of said transparency key represents an approximately 50% gray level.

12. The method of enhanced document security as set forth in claim 8, wherein said substrate is paper including optical brightening agents.

* * * * *